US012765652B2

(12) United States Patent
Lee et al.

(10) Patent No.: US 12,765,652 B2
(45) Date of Patent: Oct. 20, 2026

(54) MOBILE PHONE CASE AND ACCESSORY FOR THE SAME

(71) Applicant: HAMEE GLOBAL INC., Seoul (KR)

(72) Inventors: Bum Joon Lee, Seoul (KR); Young Eun Seo, Seoul (KR)

(73) Assignee: HAMEE GLOBAL INC., Seoul (KR)

( * ) Notice: Subject to any disclaimer, the term of this patent is extended or adjusted under 35 U.S.C. 154(b) by 212 days.

(21) Appl. No.: 18/822,427

(22) Filed: Sep. 2, 2024

(65) Prior Publication Data

US 2025/0380778 A1 Dec. 18, 2025

(30) Foreign Application Priority Data

Jun. 18, 2024 (KR) ........................ 10-2024-0078865

(51) Int. Cl.

| | |
|---|---|
| ***H04M 1/04*** | (2006.01) |
| ***A44C 25/00*** | (2006.01) |
| ***A45C 11/00*** | (2006.01) |
| ***A45F 5/00*** | (2006.01) |

(52) U.S. Cl.

CPC ................ *A45C 11/00* (2013.01); *A45F 5/00* (2013.01); *H04M 1/04* (2013.01); *A45C 11/002* (2025.01); *A45F 2005/006* (2013.01); *A45F 2005/008* (2013.01); *A45F 5/1516* (2025.01)

(58) Field of Classification Search

None

See application file for complete search history.

(56) References Cited

U.S. PATENT DOCUMENTS

| | | | | |
|---|---|---|---|---|
| 6,352,186 B1 * | 3/2002 | Endo | A45F 5/02 224/645 |
| 6,721,545 B2 * | 4/2004 | Doi | H04M 1/0283 455/90.3 |
| 7,594,305 B2 * | 9/2009 | Moore | A45F 5/00 24/3.13 |
| D736,196 S * | 8/2015 | Karis | D14/250 |
| 9,532,639 B2 * | 1/2017 | Kimble | A45F 5/00 |
| D840,678 S * | 2/2019 | Mouriz | D3/218 |
| 11,490,717 B2 * | 11/2022 | Petralia | A45C 11/00 |
| 2009/0007390 A1 | 1/2009 | Tsang et al. | |
| 2011/0034140 A1 * | 2/2011 | Yanagi | H01Q 1/242 455/226.1 |

(Continued)

FOREIGN PATENT DOCUMENTS

| | | |
|---|---|---|
| JP | 2013-046726 A | 3/2013 |
| JP | 2015-096160 A | 5/2015 |

(Continued)

OTHER PUBLICATIONS

Office Action for Korean Patent Application No. 10-2024-0078865 issued by the Korean Patent Office on Sep. 23, 2024.

(Continued)

*Primary Examiner* — Pablo N Tran

(74) *Attorney, Agent, or Firm* — IP&T GROUP LLP

(57) ABSTRACT

The present invention relates to a mobile phone case including a front surface that is open, a rear surface facing the front surface, a sidewall connected to the rear surface, an insertion part inserted from an inner surface of the sidewall toward an outer surface of the sidewall by passing through one portion of the sidewall, and a through-hole passing through the sidewall facing the insertion part.

8 Claims, 10 Drawing Sheets

(56) References Cited

U.S. PATENT DOCUMENTS

| | | | | |
|---|---|---|---|---|
| 2020/0154868 | A1* | 5/2020 | Hines-Lucas | A45C 11/00 |
| 2024/0097730 | A1* | 3/2024 | Cartwright | A45F 5/00 |

FOREIGN PATENT DOCUMENTS

| | | | |
|---|---|---|---|
| JP | 5859789 | B2 | 12/2015 |
| JP | 2016-034467 | A | 3/2016 |
| KR | 10-2005-0007137 | A | 1/2005 |
| KR | 10-0824433 | B1 | 4/2008 |
| KR | 10-2017-0002875 | A | 1/2017 |
| KR | 10-1752649 | B1 | 7/2017 |
| KR | 20-0490393 | Y1 | 11/2019 |

OTHER PUBLICATIONS

Notice of Allowance for Korean Patent Application No. 10-2024-0078865 issued by the Korean Patent Office on May 21, 2025.

* cited by examiner

MOBILE PHONE CASE AND ACCESSORY FOR THE SAME

CROSS-REFERENCE TO RELATED APPLICATION

This application claims priority to and the benefit of Korean Patent Application No. 2024-0078865, filed on Jun. 18, 2024, the disclosure of which is incorporated herein by reference in its entirety.

BACKGROUND

1. Field of the Invention

The present invention relates to a mobile phone case and an accessory for the same.

2. Discussion of Related Art

The distribution rate of mobile phones such as smartphones has increased exponentially with the expansion of mobile communication infrastructures, and mobile phone-related equipment such as cases, stands, and accessories are being developed according to the popularization of mobile phones.

In particular, due to having advantages of protecting expensive mobile phones and blocking contact with foreign matter, mobile phone cases are separately purchased and used by most mobile phone users. Mobile phone cases go beyond the basic function of protecting mobile phones and serve as a means of expressing oneself, and the demand for and interest in the design and accessories of mobile phone cases are rapidly increasing.

A conventional accessory for a mobile phone case is formed so that a strap or an ornament is connected to a ring protruding from the mobile phone case, and since a connecting portion of the ring is exposed to the outside of the mobile phone case, there is a problem in that damage to the connecting portion frequently occurs.

Another accessory for a mobile phone case is used by tying a strap in a hole formed in the mobile phone case, but there are problems in that foreign matter may enter or a mobile phone protecting function may be degraded due to the tied portion of the strap causing the mobile phone case and the mobile phone to be spaced apart, and the mobile phone case may be deformed due to the hole formed in the mobile phone case supporting an external force acting on the strap.

SUMMARY OF THE INVENTION

The present invention is directed to providing a mobile phone case and an accessory for the same in which a fixing part supporting a strap is inserted into a mobile phone case so that an external force acting on the strap is supported by the fixing part, and a portion of the fixing part that supports the strap is not exposed to the outside.

According to an aspect of the present invention, there is provided a mobile phone case including a front surface that is open, a rear surface facing the front surface, a sidewall connected to the rear surface, an insertion part inserted from an inner surface of the sidewall toward an outer surface of the sidewall by passing through one portion of the sidewall, and a through-hole passing through the sidewall facing the insertion part.

Specifically, the through-hole may include a first through-hole formed to have a cross-section smaller than a cross-section of the insertion part; and a second through-hole formed to have a different cross-section from the first through-hole.

Specifically, the cross-section of each of the first through-hole and the second through-hole may be disposed in the sidewall facing the insertion part.

Specifically, the first through-hole may include a first area formed to extend from the insertion part and have a constant cross-section; and a second area formed to have a cross-section that gradually widens from the first area toward the outer surface of the sidewall.

Specifically, the first through-hole may be formed at a higher position than the second through-hole in the sidewall.

According to another aspect of the present invention, there is provided an accessory for a mobile phone case that is coupled to a mobile phone case, the accessory including a fixing part coupled to the mobile phone case so that one portion of the fixing part protrudes through a first through-hole formed in a sidewall of the mobile phone case; and a strap having one side caught at the fixing part and the other side exposed through a second through-hole formed in the sidewall of the mobile phone case.

Specifically, the fixing part may include a flat portion engaged with the sidewall of the mobile phone case; a support portion extending perpendicular to the flat portion; and a protruding portion connected to the support portion, formed to have a wider cross-section than the support portion, and protruding through the first through-hole.

Specifically, the flat portion may be formed to have a shape that corresponds to an insertion part inserted from an inner surface of the sidewall toward an outer surface of the sidewall by passing through one portion of the sidewall of the mobile phone case.

Specifically, the flat portion may be disposed on the same plane as the inner surface of the sidewall while inserted into the insertion part.

Specifically, the one side of the strap may be disposed to pass the flat portion or the protruding portion and surround the support portion and may be caught by movement of the one side being limited on the support portion by the flat portion and the protruding portion.

Specifically, when the fixing part and the mobile phone case are coupled, the support portion may be disposed in a first area of the first through-hole that is formed to have a constant cross-section, and the protruding portion may be disposed in a second area thereof formed to have a cross-section that gradually widens from the first area toward the outer surface of the sidewall.

Specifically, when the fixing part and the mobile phone case are coupled, the caught one side of the strap may be disposed in the first area and may be spaced apart from the second area due to the protruding portion.

Specifically, the accessory may further include an ornament part coupled to the other side of the strap.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
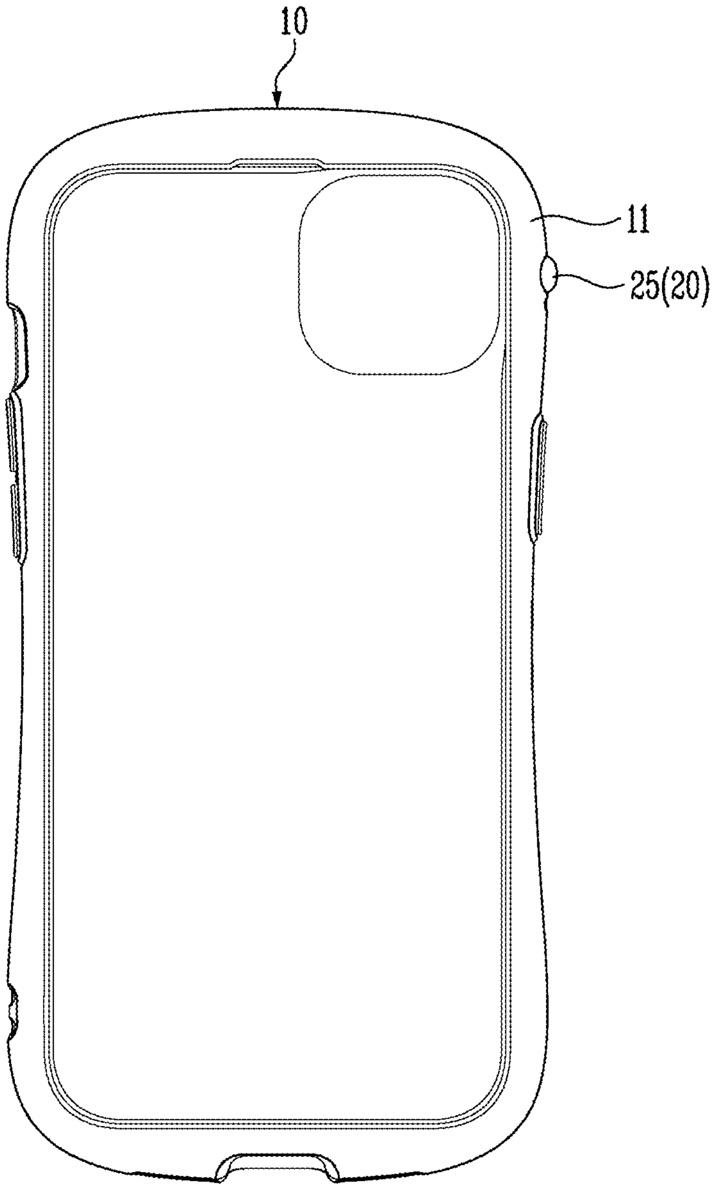
FIG. 1 is a front view of a mobile phone case to which an accessory for a mobile phone case is coupled according to one embodiment of the present invention.

Objectives, specific advantages, and novel features of the present invention will become more apparent from the following detailed description and exemplary embodiments associated with the accompanying drawings. In assigning reference numerals to components of each drawing, it should be noted that the same reference numerals are assigned to the same components wherever possible even when the components are illustrated in different drawings. Also, in describing the present invention, when it is determined that the detailed description of a known related art may unnecessarily obscure the gist of the present invention, the detailed description thereof will be omitted.

Figure 2:
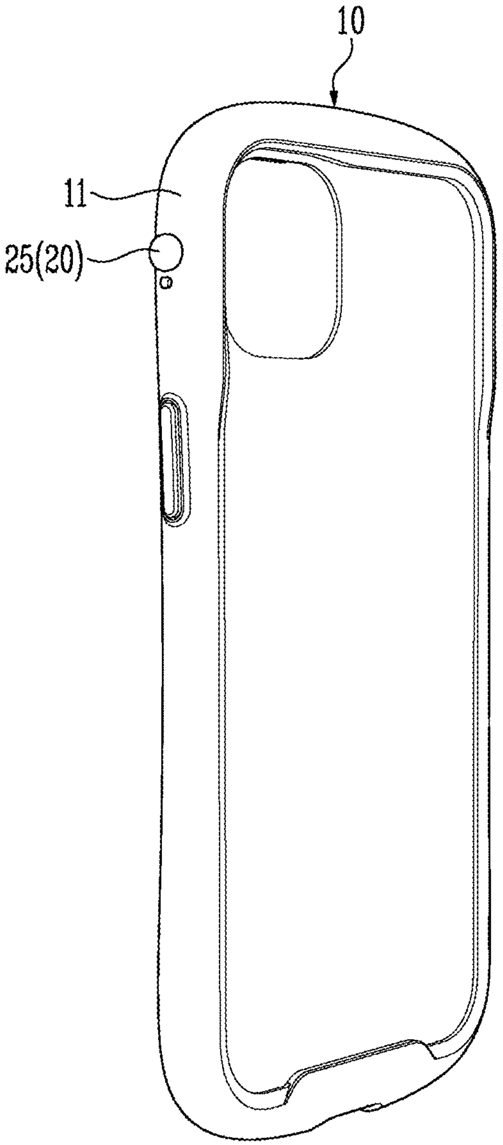
FIG. 2 is a side rear view of the mobile phone case to which the accessory for a mobile phone case is coupled according to one embodiment of the present invention.

FIG. 1 is a front view of a mobile phone case to which an accessory for a mobile phone case is coupled according to one embodiment of the present invention, and FIG. 2 is a side rear view of the mobile phone case to which the accessory for a mobile phone case is coupled according to one embodiment of the present invention.

Referring to FIG. 1, an accessory for a mobile phone case may be coupled to a mobile phone case 10 and may have one portion protruding therefrom. The mobile phone case 10 may include a front surface that is open, a rear surface facing the front surface, and a sidewall 11 connected to the rear surface.

The mobile phone case 10 may be made of synthetic resin, silicone, or the like and may be manufactured to be transparent, translucent, or opaque.

The mobile phone case 10 can be coupled to and separated from a mobile phone through the open front surface.

When the mobile phone case 10 and a mobile phone are coupled, a display of the mobile phone may be disposed at the open front surface. The rear surface of the mobile phone case 10 may be formed to face the front surface and may have a camera exposure hole that is open formed in one portion thereof.

The sidewall 11 of the mobile phone case 10 may be formed to extend forward from the periphery of the rear surface. Based on FIG. 1, a vertical direction having a relatively longer length may correspond to a height direction, and a horizontal direction may correspond to a width direction.

Referring to FIG. 1, a fixing part 20 of the accessory for a mobile phone case may have one portion protruding through the sidewall 11. The accessory for a mobile phone case may pass through the sidewall 11 of the mobile phone case 10.

FIG. 2 is a view of the mobile phone case 10 from the side rear, and although the accessory for a mobile phone case is positioned adjacent to the camera exposure hole in the rear surface of the mobile phone case 10, the position of the accessory for a mobile phone case is not limited thereto. The mobile phone case 10 may include an insertion part 50 and a through-hole, which will be described in detail below with reference to FIG. 3.

Figure 3:
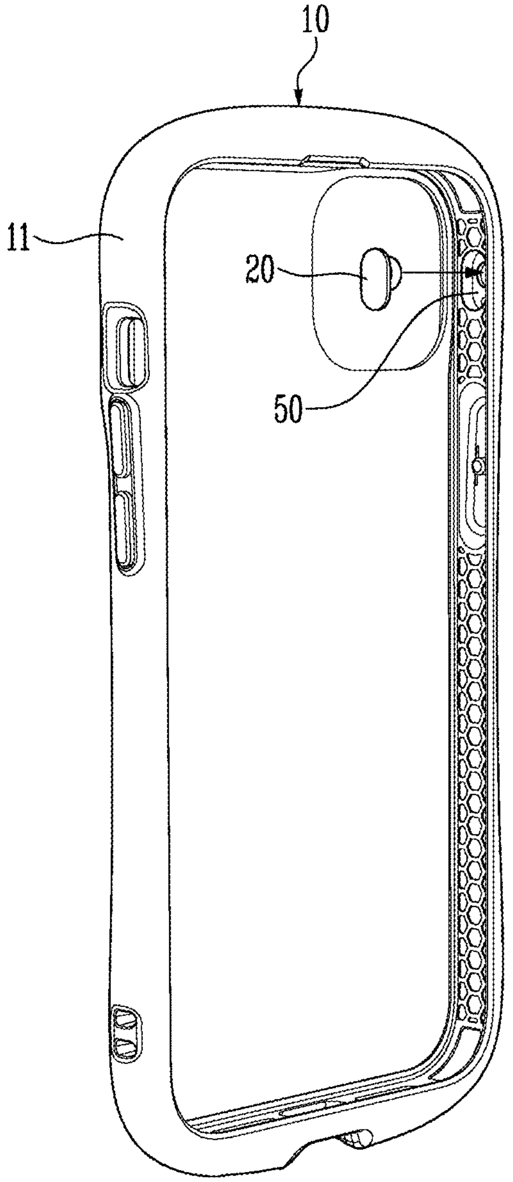
FIG. 3 is an enlarged view of the mobile phone case according to one embodiment of the present invention.
Figure 4:
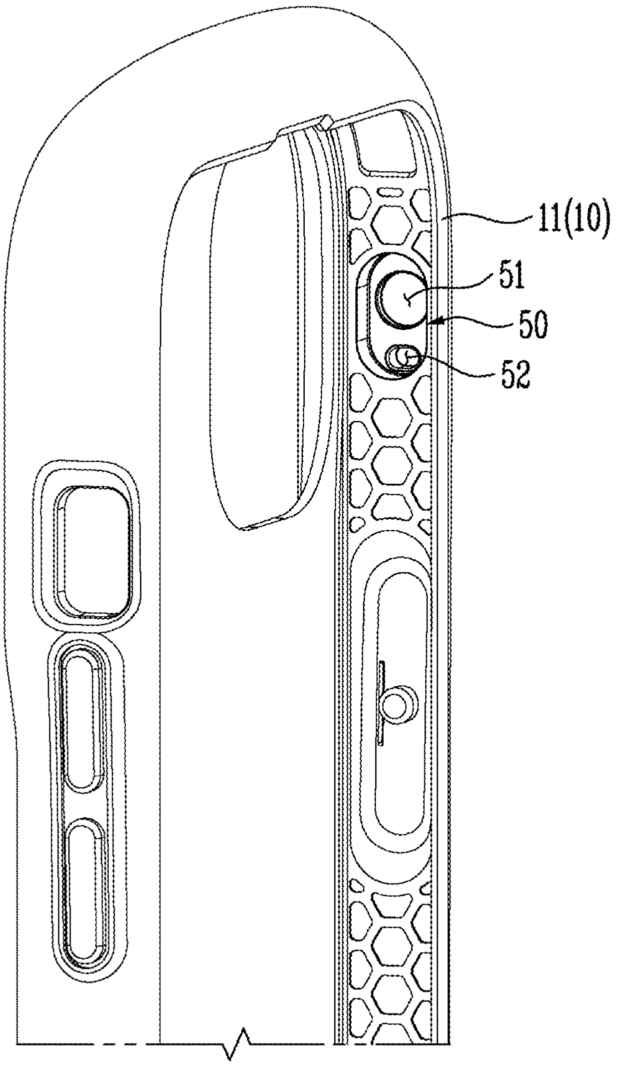
FIG. 4 is another enlarged view of the mobile phone case according to one embodiment of the present invention.

FIG. 3 is an enlarged view of the mobile phone case according to one embodiment of the present invention. FIG. 4 is another enlarged view of the mobile phone case according to one embodiment of the present invention;

FIG. 3 shows the mobile phone case 10 viewed obliquely and illustrates the insertion part 50 formed in an inner surface of the sidewall 11. The mobile phone case 10 may include the insertion part 50 and a through-hole.

The insertion part 50 may be inserted from the inner surface of the sidewall 11 toward an outer surface of the sidewall 11 by passing through one portion of the sidewall 11. The insertion part 50 may be inserted at a depth that is smaller than a width of the sidewall 11, and thus it may be difficult to recognize the insertion part 50 from the outer surface of the sidewall 11.

An area of the sidewall 11 where the insertion part 50 is disposed may be formed to have a smaller width than an adjacent area. Referring to FIG. 3, a button insertion part (not denoted by a reference numeral) into which buttons of a mobile phone are inserted may be formed in the sidewall 11. The insertion part 50 may have a form that is inserted from the inner surface of the sidewall 11 toward the outer surface of the sidewall 11 like the button insertion part but may not correspond to the buttons of the mobile phone. The insertion part 50 may be formed at a position that does not correspond to the buttons of the mobile phone.

When the mobile phone and the mobile phone case 10 are coupled, although the buttons of the mobile phone are inserted into the button insertion part, the buttons of the mobile phone may not be inserted into the insertion part 50. The insertion part 50 may be a dedicated space for the accessory for a mobile phone case. When the accessory for a mobile phone case is not coupled to the insertion part 50, the insertion part 50 may remain empty.

The insertion part 50 may be coupled to the fixing part 20 of the accessory for a mobile phone case. At least one portion of the fixing part 20 may be formed to have a cross-section that corresponds to the insertion part 50, and the fixing part 20 may be engaged with the insertion part 50.

An area of the sidewall 11 that faces the insertion part 50 may have a through-hole formed therein. The through-hole may pass through the sidewall 11 facing the insertion par t50.

Referring to FIG. 4, the through-hole may include a first through-hole 51 and a second through-hole 52.

The first through-hole 51 may be formed to have a cross-section smaller than a cross-section of the insertion part 50.

The first through-hole 51 may have a cross-section disposed in the sidewall 11 facing the insertion part 50. The first through-hole 51 may be formed to be spaced apart from the second through-hole 52 and may be formed at a higher position than the second through-hole 52.

A protruding portion 25 of the fixing part 20 may pass through the first through-hole 51. The cross-section of the first through-hole 51 may be formed to have a size larger than or equal to the size of a cross-section of the protruding portion 25. The first through-hole 51 may include a first area and a second area whose cross-sections are different from each other.

The first area may be formed to extend from the insertion part 50 and have a constant cross-section.

Figure 6:
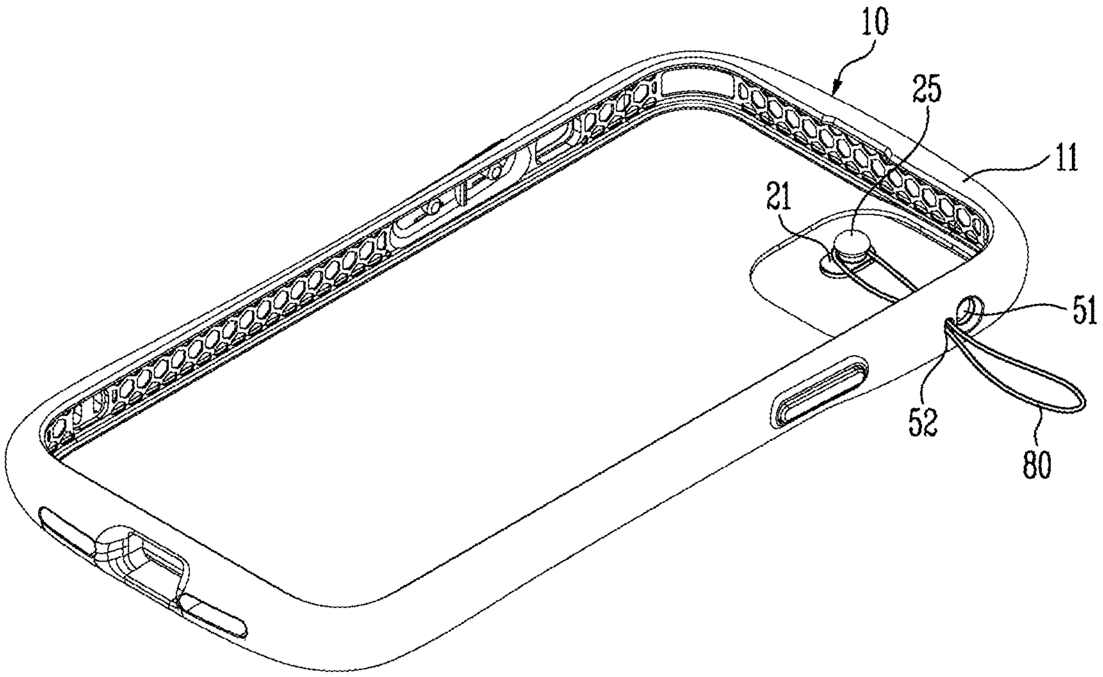
FIG. 6 is a view for describing a preparation process for coupling the accessory for a mobile phone case to the mobile phone case according to one embodiment of the present invention.

The second area may be formed to have a cross-section that gradually widens from the first area toward the outer surface of the sidewall 11. FIG. 3 is a view of the inner surface of the sidewall 11, and while the first area is illustrated in FIG. 3, the second area is not illustrated therein. The second area is illustrated in FIG. 6.

The second through-hole 52 may be formed to have a different cross-section from the first through-hole 51. The second through-hole 52 may be formed at a lower position than the first through-hole 51. A strap 80 of the accessory for a mobile phone case may pass through the second through-hole 52. The strap 80 supported by the fixing part 20 may pass through the second through-hole 52.

The second through-hole 52 may be formed to have a smaller cross-section than the first through-hole 51. The second through-hole 52 may be formed to have a small cross-section so that the fixing part 20 cannot pass therethrough. The second through-hole 52 may have a cross-section disposed in the sidewall 11 facing the insertion part 50.

The insertion part 50 may communicate with the outside by passing through the sidewall 11 through the first through-hole 51 and the second through-hole 52. Although the shapes of the insertion part 50, the first through-hole 51, and the second through-hole 52 are illustrated in FIG. 3, each of the shapes is not limited thereto and may be changed FIG. 5 is a perspective view of the accessory for a mobile phone case according to one embodiment of the present invention.

The accessory for a mobile phone case may be coupled to the mobile phone case 10 and may include at least the fixing part 20. Although the accessory for a mobile phone case is described below as including the fixing part 20 and the strap 80, the present invention is not limited thereto. The accessory for a mobile phone case may refer only to the fixing part 20. Even when only the fixing part 20, without the strap 80, is coupled to the mobile phone case 10, it is one embodiment of the present invention.

Figure 5:
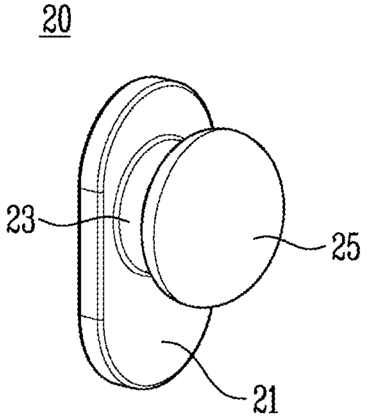
FIG. 5 is a perspective view of the accessory for a mobile phone case according to one embodiment of the present invention.

FIG. 5 is a view of the fixing part 20, and the strap 80 may correspond to a commonly used strap type member.

The fixing part 20 may be coupled to the mobile phone case 10 so that one portion of the fixing part 20 protrudes through the first through-hole 51 formed in the sidewall 11 of the mobile phone case 10. The fixing part 20 may include a flat portion 21, a support portion 23, and the protruding portion 25.

The flat portion 21 may be engaged with the sidewall 11 of the mobile phone case 10.

The flat portion 21 may be formed in a plate shape and have the support portion 23 formed on one surface thereof.

The flat portion 21 may be formed to have a shape that corresponds to the insertion part 50. When the fixing part 20 and the mobile phone case 10 are coupled, the flat portion 21 may be disposed to be engaged with the insertion part 50.

The support portion 23 may extend perpendicular to the flat portion 21. The support portion 23 may connect the flat portion 21 and the protruding portion 25. The support portion 23 may have one end connected to the flat portion 21 and the other end connected to the protruding portion 25. The support portion 23 may be formed in a pillar shape.

The support portion 23 may be formed to have a cross-section smaller than the cross-section of the first through-hole 51.

When the fixing part 20 and the mobile phone case 10 are coupled, the support portion 23 may be positioned in the first through-hole 51.

The protruding portion 25 may be connected to the support portion 23 and may be formed to have a wider cross-section than the support portion 23. Since the protruding portion 25 is formed to have a wider cross-section than the support portion 23, the protruding portion 25 can limit movement of the strap 80 seated on the support portion 23. Referring to FIG. 4, although the protruding portion 25 has a spherical shape, the shape of the protruding portion 25 is not limited thereto, and the protruding portion 25 may also be formed in a polygonal shape.

The protruding portion 25 may protrude through the first through-hole 51 past the first through-hole 51.

When the fixing part 20 and the mobile phone case 10 are coupled, the protruding portion 25 may protrude through the sidewall 11 of the mobile phone case 10.

When the fixing part 20 and the mobile phone case 10 are coupled, the protruding portion 25 may be disposed in the second area of the first through-hole 51 past the first region thereof. When the fixing part 20 and the mobile phone case 10 are coupled, the protruding portion 25 may separate the first area and the second area.

The strap 80 is formed in a strap shape and may be formed of various materials such as a metal, a fiber, and plastic. The strap 80 may have one side caught at the fixing part 20 and the other side exposed through the second through-hole 52.

The strap 80 may be disposed to be caught at the fixing part 20 and exposed outside the mobile phone case 10. The strap 80 corresponds to an extension member, and the other side of the strap 80 may be coupled to an ornament part.

The strap 80 may be coupled to the mobile phone case 10 while seated on the support portion 23 of the fixing part 20, and this will be described below with reference to FIG. 6.

FIG. 6 is a view for describing a preparation process for coupling the accessory for a mobile phone case to the mobile phone case according to one embodiment of the present invention.

The fixing part 20 of the accessory for a mobile phone case may be inserted into the insertion part 50 of the mobile phone case 10 and fixed. The fixing part 20 may be inserted into the insertion part 50 while the strap 80 is seated thereon as illustrated in FIG. 6 or while the strap 80 is not seated thereon as illustrated in FIG. 5. The protruding portion 25 of the fixing part 20 may pass through the first through-hole 51 and protrude through the sidewall 11.

The protruding portion 25 may be seated on the second area of the first through-hole 51 past the insertion part 50 and the first area of the first through-hole 51. Since the second area is formed to have a wider cross-section than the protruding portion 25, the protruding portion 25 may be surrounded by the second area.

The support portion 23 may be disposed in the first through-hole 51 past the insertion part 50. Although the strap 80 is not seated on the fixing part 20 in FIG. 5, when the strap 80 is seated on the fixing part 20, the strap 80 may be disposed in the first through-hole 51 together with the support portion 23.

The flat portion 21 may be formed to have a shape that corresponds to the insertion part 50 and may be coupled to the insertion part 50.

One surface of the flat portion 21 on which the support portion 23 is formed may face the first through-hole 51 and the second through-hole 52. The flat portion 21 may block one side of each of the first through-hole 51 and the second through-hole 52.

The first area of the first through-hole 51 may have one side blocked by the flat portion 21 and the other side blocked by the protruding portion 25. The second area of the first through-hole 51 may have one side blocked by the protruding portion 25 and the other side open toward the outside.

The second through-hole 52 may have one side blocked by the flat portion 21 and the other side open toward the outside.

In another embodiment, an auxiliary portion protruding toward the insertion part 50 may be formed on the sidewall 11. As the auxiliary portion, at least one member may protrude from the inner surface of the sidewall 11 toward the insertion part 50. The auxiliary portion may be formed to be elastically deformable and may be deformed when the fixing part 20 is inserted into the insertion part 50. The auxiliary portion may prevent the fixing part 20 inserted into the insertion part 50 from moving inward. The auxiliary portion may support the other surface of the flat portion 21 of the fixing part 20.

FIG. 6 shows a state in which the strap 80 is seated on the fixing part 20, and the strap 80 may be disposed on the support portion 23 of the fixing part 20. The strap 80 may have one side disposed to surround the support portion 23 and the other side passing through the second through-hole 52. The order of the process in which the strap 80 surrounds the support portion 23 or the process in which the strap 80 passes through the second through-hole 52 does not matter.

The strap 80 may have a ring shape and may be integrally formed. Alternatively, the strap 80 may have a strap shape and extend in both directions while having one portion coupled and formed in a ring shape.

When the strap 80 has one portion coupled to have a ring shape, the coupled portion may be disposed adjacent to the support portion 23.

The strap 80 may have one side disposed to pass the flat portion 21 or the protruding portion 25 and surround the support portion 23. Referring to FIG. 6, the strap 80 is not fixed while surrounding the support portion 23 and disposed on the flat portion 21. The movement of the strap 80 may be limited by the flat portion 21 and the protruding portion 25.

The protruding portion 25 and the flat portion 21 may be formed to have a wider cross-section than the support portion 23 and may limit the movement of the strap 80 surrounding the support portion 23. The strap 80 may be caught so that the movement thereof is limited while surrounding the support portion 23.

Before the fixing part 20 is coupled to the insertion part 50, when the strap 80 is moved to be wider than the cross-section of the protruding portion 25 or the flat portion 21, the caught strap 80 may be released.

The fixing part 20 may be coupled to the insertion part 50 in a state in which one side of the strap 80 surrounds the support portion 23 and the other side of the strap 80 passes through the second through-hole 52. By one surface of the flat portion 21 on which the support portion 23 is disposed being disposed to face the insertion part 50 and horizontally moving, the flat portion 21 may be inserted into the insertion part 50.

The protruding portion 25 may be seated on the second area of the first through-hole 51 past the first area thereof, and the flat portion 21 may block the insertion part 50. The movement of the strap 80 may be limited by the strap 80 being disposed on the support portion 23 formed between the protruding portion 25 and the flat portion 21.

The one side of the strap 80 that is caught may be disposed in the first area of the first through-hole 51 and may be spaced apart from the second area due to the protruding portion 25. The strap 80 may be caught so that the movement thereof is limited by the protruding portion 25 and the flat portion 21.

Figure 7:
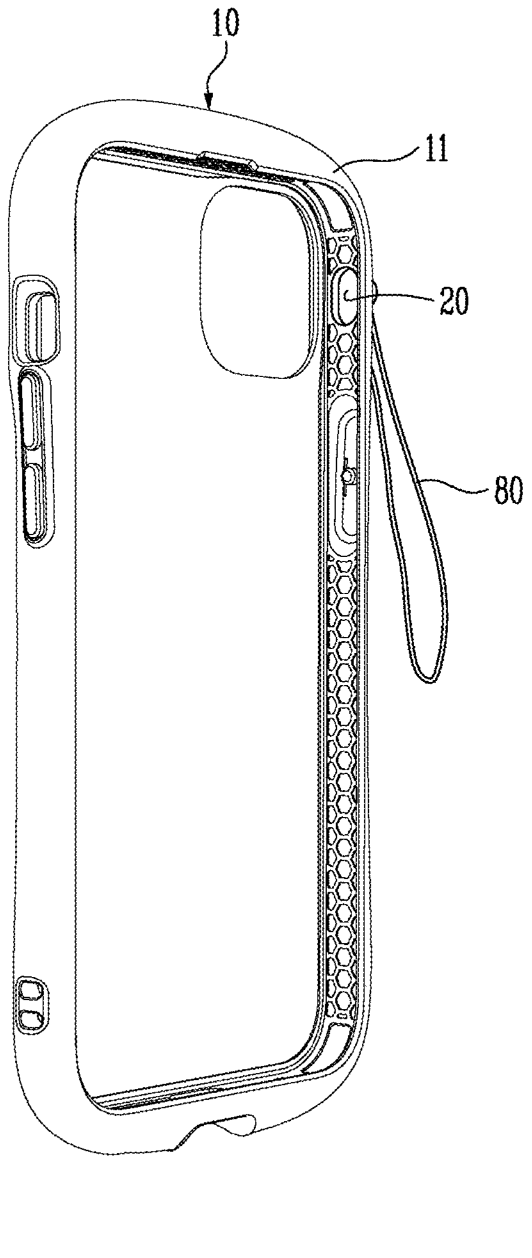
FIG. 7 is a view for describing a state in which the accessory for a mobile phone case is coupled to the mobile phone case according to one embodiment of the present invention.

FIG. 7 is a view for describing a state in which the accessory for a mobile phone case is coupled to the mobile phone case according to one embodiment of the present invention.

FIG. 7 shows a state in which the fixing part 20 and the strap 80 of FIG. 6 are coupled to the mobile phone case 10.

The fixing part 20 may be inserted into the insertion part 50 and fixed, the one side of the strap 80 may be disposed inside the insertion part 50, and the other side of the strap 80 may pass through the second through-hole 52 and be exposed to the outside.

The one side of the strap 80 may be caught and fixed, and the other side of the strap 80 may freely move.

The horizontal movement of the one side of the strap 80 may be limited by the flat portion 21 and the protruding portion 25.

Specifically, the one side of the strap 80 may be positioned on the support portion 23 disposed in the first through-hole 51. The vertical movement of the one side of the strap 80 may be limited by the first through-hole 51. The one side of the strap 80 may be disposed to surround the support portion 23 of the fixing part 20, and an external force acting on the strap 80 may act on the support portion 23.

When the strap 80 is pulled by an external force, the external force may act on the support portion 23 and may not affect the mobile phone case 10. Even when an external force acts on the strap 80, the mobile phone case 10 may not be deformed.

When the fixing part 20 is coupled to the insertion part 50, the support portion 23 is positioned inside the insertion part 50 without being exposed to the outside. Since the support portion 23 caught together with the strap 80 is not exposed to the outside, the caught support portion 23 is not released due to an external force, and thus it is stable.

Referring to FIG. 7, the flat portion 21 inserted into the insertion part 50 is inserted closer to the outer surface of the sidewall 11 than to the inner surface of the sidewall 11. The present invention is not limited thereto, and in another embodiment, the flat portion 21 may be disposed on the same plane as the inner surface of the sidewall 11 while inserted into the insertion part 50.

Figure 8:
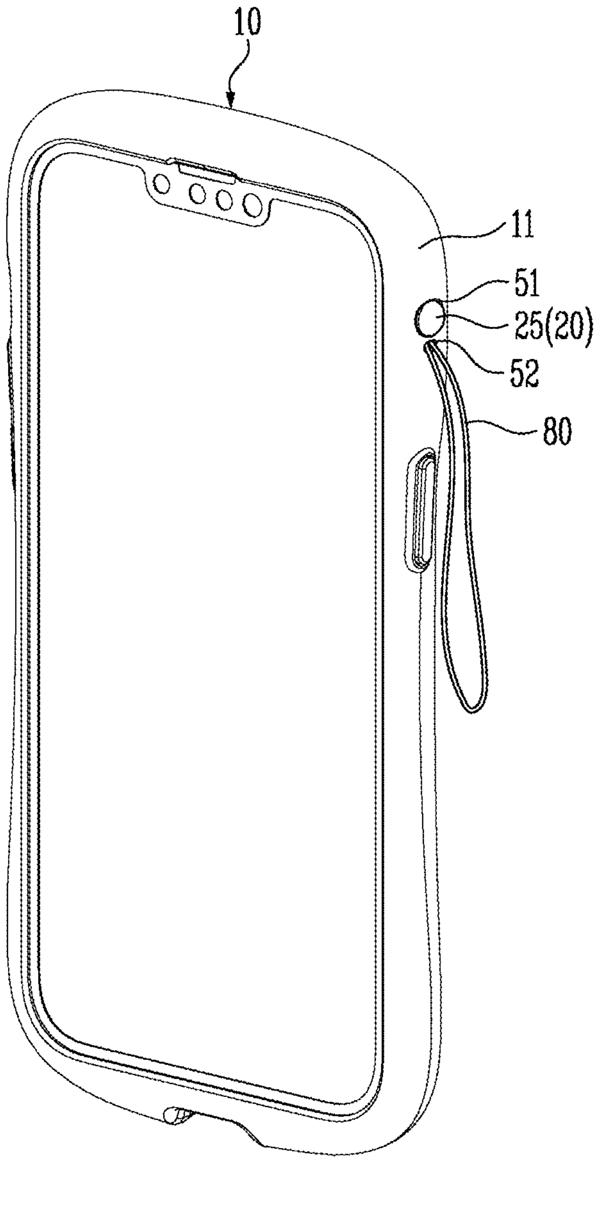
FIG. 8 is a view of a mobile phone coupled to the mobile phone case to which the accessory for a mobile phone case is coupled according to one embodiment of the present invention.

FIG. 8 is a view of a mobile phone coupled to the mobile phone case to which the accessory for a mobile phone case is coupled according to one embodiment of the present invention.

Referring to FIG. 8, the protruding portion 25 may be disposed to protrude through the first through-hole 51, and the support portion 23 and the flat portion 21 may not be exposed to the outside. The caught one side of the strap 80 may not be exposed to the outside, and the other side of the strap 80 may pass through the second through-hole 52 and be exposed to the outside.

The protruding portion 25 may be exposed outside the mobile phone case 10 and may let the user recognize that the accessory for a mobile phone case according to the present invention is mounted. The protruding portion 25 may be exposed outside the mobile phone case 10 and serve as one design.

Even when the protruding portion 25 is not caught together with the strap 80, since the protruding portion 25 can be coupled to the insertion part 50 of the mobile phone case 10, the protruding portion 25 may be exposed outside the mobile phone case 10.

Since the strap 80 can be coupled to the ornament part, members of various shapes may be coupled to the strap 80. The strap 80 is formed to be able to be worn around the user's wrist, and thus the mobile phone and the mobile phone case 10 may be supported through the strap 80.

Figure 9:
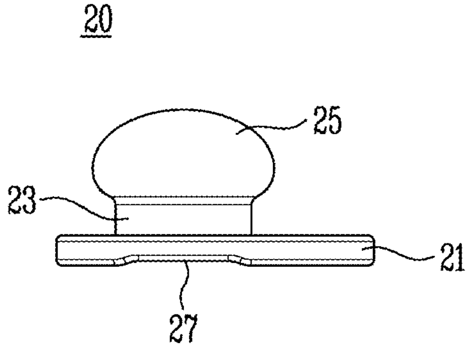
FIG. 9 is a side view of an accessory for a mobile phone case according to another embodiment of the present invention.
Figure 10:
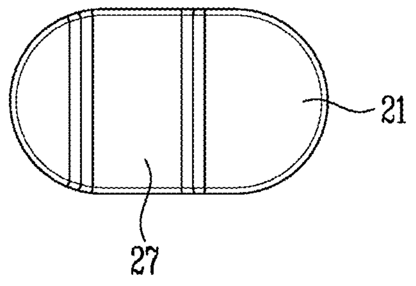
FIG. 10 is a rear view of the accessory for a mobile phone case according to another embodiment of the present invention.

FIG. 9 is a side view of an accessory for a mobile phone case according to another embodiment of the present invention, and FIG. 10 is a rear view of the accessory for a mobile phone case according to another embodiment of the present invention.

Compared to the fixing part 20 shown in FIG. 4, a fixing part 20 shown in FIGS. 9 and 10 may further include a bent portion 27.

The bent portion 27 may be formed on the other surface of the flat portion 21 that faces the one surface of the flat portion 21 on which the support portion 23 is disposed. The bent portion 27 may correspond to an area in which one portion of the flat portion 21 is bent.

Referring to FIG. 9, the bent portion 27 may be formed in a form that is inserted from the other surface of the flat portion 21 toward the one surface thereof. On the other surface of the flat portion 21, the area in which the bent portion 27 is formed may be formed to have a smaller thickness than other areas. In a state in which the fixing part 20 is coupled to the mobile phone case 10, the bent portion 27 may be disposed to be farther from the mobile phone than the other surface of the flat portion 21.

Referring to FIG. 10, although the bent portion 27 is formed in a vertical direction of the other surface of the flat portion 21, the bent portion 27 may also be formed in a horizontal direction thereof. The bent portion 27 may correspond to an insertion area of the other surface of the flat portion 21.

By a mobile phone case and an accessory for the same according to the present invention, since a fixing part supporting a strap is inserted into the mobile phone case so that an external force acting on the strap is supported by the fixing part, deformation of the mobile phone case can be prevented, and since a portion of the fixing part that supports the strap is not exposed to the outside, the strap can be stably supported.

The present invention is not limited to the embodiments described above and may include a combination of the above embodiments and known art as still another embodiment.

Although specific embodiments of the present invention have been described in detail above, the embodiments are only for describing the present invention in detail, and the present invention is not limited thereto. It should be apparent that modifications or changes thereto may be made by those of ordinary skill in the art within the technical spirit of the present invention.

Simple modifications or changes to the present invention all belong to the range of the present invention, and a specific protection scope of the present invention will be apparent from the appended claims.

What is claimed is:

1. An accessory for a mobile phone case that is coupled to a mobile phone case, the accessory comprising:
- a fixing part coupled to the mobile phone case so that one portion of the fixing part protrudes through a first through-hole formed in a sidewall of the mobile phone case; and
- a strap having one side caught at the fixing part and the other side exposed through a second through-hole formed in the sidewall of the mobile phone case.

2. The accessory of claim 1, wherein the fixing part includes:
- a flat portion engaged with the sidewall of the mobile phone case;
- a support portion extending perpendicular to the flat portion; and
- a protruding portion connected to the support portion, formed to have a wider cross-section than the support portion, and protruding through the first through-hole.

3. The accessory of claim 2, wherein the flat portion is formed to have a shape that corresponds to an insertion part inserted from an inner surface of the sidewall toward an outer surface of the sidewall by passing through one portion of the sidewall of the mobile phone case.

4. The accessory of claim 3, wherein the flat portion is disposed on the same plane as the inner surface of the sidewall while inserted into the insertion part.

5. The accessory of claim 2, wherein the one side of the strap is disposed to pass the flat portion or the protruding portion and surround the support portion and is caught by movement of the one side being limited on the support portion by the flat portion and the protruding portion.

6. The accessory of claim 2, wherein, when the fixing part and the mobile phone case are coupled, the support portion is disposed in a first area of the first through-hole that is formed to have a constant cross-section, and the protruding portion is disposed in a second area thereof formed to have a cross-section that gradually widens from the first area toward the outer surface of the sidewall.

7. The accessory of claim 6, wherein, when the fixing part and the mobile phone case are coupled, the caught one side of the strap is disposed in the first area and is spaced apart from the second area due to the protruding portion.

8. The accessory of claim 1, further comprising an ornament part coupled to the other side of the strap.

* * * * *